US 11,771,052 B2

(12) United States Patent
Beaton

(10) Patent No.: US 11,771,052 B2
(45) Date of Patent: Oct. 3, 2023

(54) PORTABLE POP-UP PET PEN

(71) Applicant: Eunice Beaton, Vernon Center, NY (US)

(72) Inventor: Eunice Beaton, Vernon Center, NY (US)

( * ) Notice: Subject to any disclaimer, the term of this patent is extended or adjusted under 35 U.S.C. 154(b) by 210 days.

(21) Appl. No.: 17/374,363

(22) Filed: Jul. 13, 2021

(65) Prior Publication Data

US 2023/0019780 A1     Jan. 19, 2023

(51) Int. Cl.
| | |
|---|---|
| *A01K 1/02* | (2006.01) |
| *A01K 1/00* | (2006.01) |
| *B62B 1/10* | (2006.01) |
| *A01K 1/03* | (2006.01) |
| *B62B 5/00* | (2006.01) |

(52) U.S. Cl.
CPC .......... *A01K 1/0245* (2013.01); *A01K 1/0035* (2013.01); *A01K 1/033* (2013.01); *B62B 1/10* (2013.01); *B62B 5/0023* (2013.01)

(58) Field of Classification Search
CPC .... A47D 13/06; A47D 13/061; A47D 13/065; A47D 13/063; A47D 13/066; A47D 13/068; A47D 15/008; A47G 5/02; A47G 5/00; B62B 1/10; B62B 5/0023; A01K 1/0035; A01K 1/033; A01K 1/0245; A01K 1/0272; A01K 1/0281
See application file for complete search history.

(56) References Cited

U.S. PATENT DOCUMENTS

| | | | |
|---|---|---|---|
| 1,655,515 A | * | 1/1928 | Simpson .................. A47G 5/00 160/183 |
| 5,010,848 A | | 4/1991 | Rankin |
| 5,943,982 A | | 8/1999 | Askins et al. |
| 6,899,057 B1 | | 5/2005 | Chrisco et al. |
| 8,141,517 B2 | | 3/2012 | Shimoda et al. |
| 8,746,179 B2 | | 6/2014 | Farmer et al. |
| 9,107,387 B1 | | 8/2015 | Pavlik |
| 9,485,957 B2 | | 11/2016 | Kellogg |
| 9,598,896 B1 | * | 3/2017 | Pichik ....................... E06B 9/13 |
| 10,100,574 B2 | * | 10/2018 | Reiner ...................... E06B 9/18 |
| 10,513,870 B1 | * | 12/2019 | Jackson .................. E04H 17/05 |
| 10,538,958 B2 | * | 1/2020 | Losik ........................ E06B 9/02 |
| 10,794,022 B2 | * | 10/2020 | Reiner .................. E01F 13/022 |
| 11,008,774 B2 | * | 5/2021 | Shi ........................ E04H 17/124 |
| 11,192,009 B1 | * | 12/2021 | Saphire ................ A63B 67/002 |

(Continued)

FOREIGN PATENT DOCUMENTS

| | | |
|---|---|---|
| CA | 2436674 A1 | 2/2005 |
| DE | 2461313 A1 * 12/1974 | ............... A47G 5/00 |

(Continued)

*Primary Examiner* — Ebony E Evans
(74) *Attorney, Agent, or Firm* — Bernhard P. Molldrem, Jr.

(57) ABSTRACT

A portable pop-up pet pen compacts into four corner post members for travel or storage. Each corner post member contains a base rail, top rail, and mesh wall portion. To open the pet pen, the base rails are pulled out and down, and each is connected to the base of another of the corner post members. The upper rails and web walls are then pulled up from the base rails, and are attached to the other corner post members. A top frame may support a roof or fly. The compacted posts can fit into a bag or case for storage. Two sets of four corner posts can be used to build a double-size pet pen.

9 Claims, 4 Drawing Sheets

(56) References Cited

U.S. PATENT DOCUMENTS

| | | | | |
|---|---|---|---|---|
| 11,486,159 B2* | 11/2022 | Shull | ............... | E04H 15/005 |
| 2005/0173078 A1* | 8/2005 | Perez | ............... | A01K 1/035 |
| | | | | 160/99 |
| 2008/0121352 A1* | 5/2008 | Cheng | ............... | E01F 13/028 |
| | | | | 160/238 |
| 2012/0186755 A1* | 7/2012 | Sessa | ............... | E06B 9/54 |
| | | | | 160/239 |
| 2018/0044868 A1* | 2/2018 | Miller | ............... | E01F 13/028 |
| 2019/0289814 A1 | 9/2019 | Zhuo | | |

FOREIGN PATENT DOCUMENTS

| | | | | |
|---|---|---|---|---|
| GB | 2468922 A * | 9/2010 | ............... | A47G 5/02 |
| WO | WO 2007/095832 A1 | 8/2007 | | |
| WO | WO 2018/169693 A1 | 9/2018 | | |

* cited by examiner

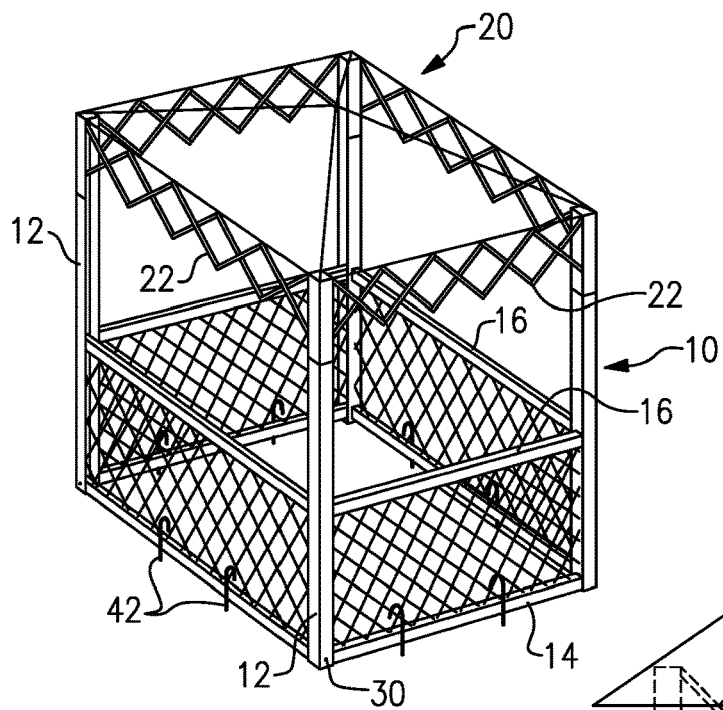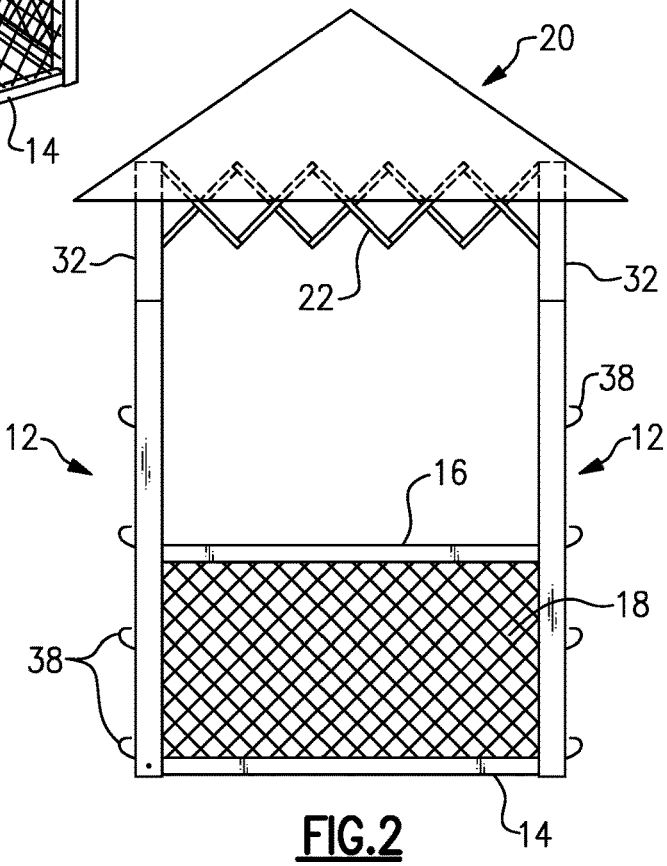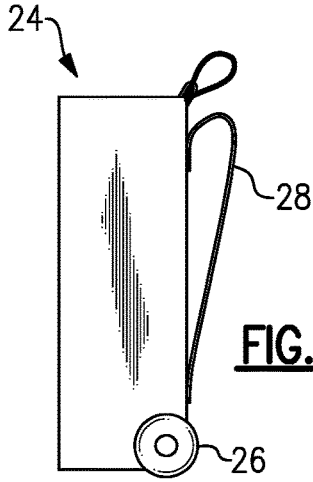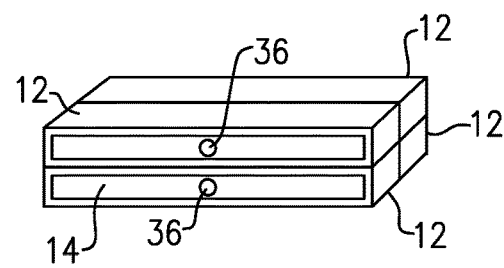

PORTABLE POP-UP PET PEN

This invention concerns portable pens and cages for confining pets, e.g., dogs or cats, to a comfortable space when away from home. The invention is more particularly concerned with a portable pet pen that can be compacted to a relatively small volume for travel in a vehicle or on public accommodations, but can quickly open up, i.e., pop up, when needed at a picnic site or camp site, for example, to give the animal a degree of freedom and comfort. The invention is more specifically concerned with a portable fold-down, pop-up pet pen that is easy to set up and take down, and provides an adequate amount of space for the pet, e.g., four feet by four feet for a small or medium dog or four feet by eight feet for a large dog. A top cover may be used for protection from rain or direct sun.

A number of modular dog houses and exercise pens have been proposed in the patent literature. For example, in Atkins et al. U.S. Pat. No. 5,943,982, various wall panels can be assembled together in various ways to provide either a pen for confining the animal or an exercise pen, which may require a large number of these panels to achieve adequate exercise space. Also, various soft-sided structures have been proposed as pet kennels or travel enclosures, e.g., in Kellogg U.S. Pat. No. 9,485,957 and Farmer et al. U.S. Pat. No. 8,746,179. However, none takes the form of a stored compact package that pops up for use as a pet pen at an outdoor site.

SUMMARY OF THE INVENTION

The present invention is for a portable, fold-down pop-up pet pen that can keep a dog or other pet comfortably confined at an outdoors site. The device is normally folded down for storage or transportation, but pops open for use as a pet pen. The pet pen itself comprises four vertical post members, i.e., corner posts. Each of the corner posts contains a rail or bar that swings down to join the base of the next one of the corner post members. Each joins to the next to form a square configuration. There is a top rail within the base rail, and the top rail pulls up and attaches a few feet up from the support surface. This action pulls up a fencing component, e.g., plastic covered wire or a scissors arrangement, stiff enough to keep the dog from chewing through. Thus an open wire fencing wall is formed along each of the four sides. With all four vertical corner posts connected, the four vertical posts form generally square area of about four feet by four feet. For a larger dog where more space is needed, two of these units can be used together, with one side open on each of the two units. The two open sides are clamped together by clamping the paired vertical posts about four feet up. This creates an open space of about four feet by eight feet.

The basic components all fit into the respective vertical legs or corner posts, and then the four posts fit together in a two-by-two array that neatly fits into a wheeled travel bag or case.

An optional roof or top or rain fly can be easily installed onto a top frame that can be mounted to the top portions of the four corner posts.

BRIEF DESCRIPTION OF THE DRAWING FIGURES

FIG. 1 is a perspective view of a pop-up pet pen according to an embodiment of this invention.

FIG. 2 is a side or end view thereof.

FIG. 3 is a side view of a wheeled storage and transport case or bag for the pop-up pet pen when in its folded-down and compacted configuration.

FIG. 4 shows the four corner posts placed together in a two-by-two array with rails and fencing compactly stored inside them.

DETAILED DESCRIPTION OF THE PREFERRED EMBODIMENT

Figure 5:
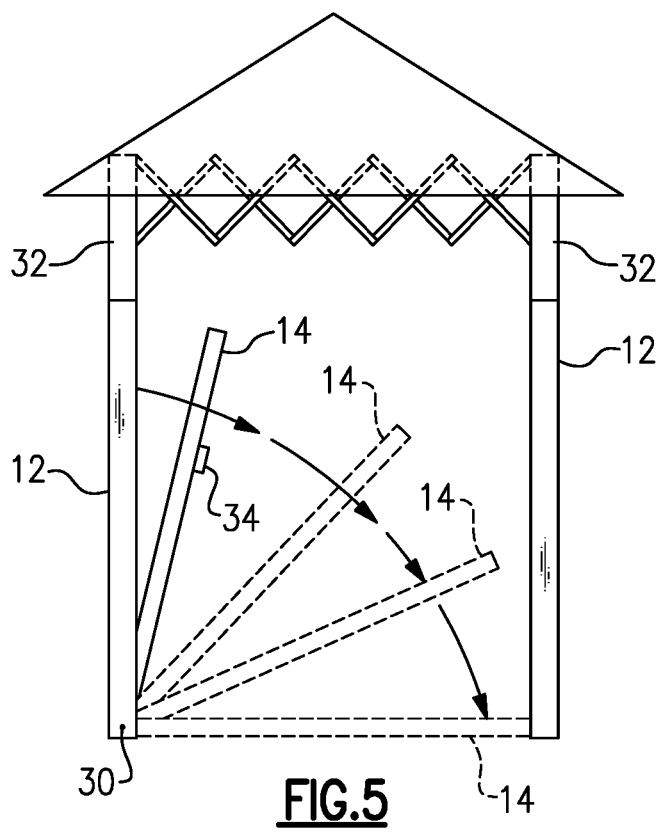
FIG. 5 illustrates the base rail of one corner post being swung down to a lowered or horizontal position to join to the base of a second corner post.

With reference to the Figures of Drawing, and initially to FIGS. 1 and 2 thereof, a pop-up dog pen 10 is shown fully opened out, with a framework formed of four vertical corner posts 12, lower rails 14 joining the base of each of the posts 12 to its neighboring posts 12, upper rails 16 extending between each of the rails 12 and its neighboring posts 12 at about thirty inches above the supporting ground surface, and a mesh wall portion 18 in the space between the posts and between the base rail 14 and upper rail 16. As shown in this embodiment, each post has an extender portion 32 that extends upward and a roof frame 20 supported at the top and which can be used to support a roof or rain fly to block rainfall and/or provide shade for the animal in the pen. A scissors-action extension 22 at the top extends between the tops of respective posts 12 to provide additional stability.

When the pop-up pen 10 is completely compacted and folded down, it can be contained within a portable case or bag 24 as shown in FIG. 3. This can have a generally square section, and can include wheels or rollers 26 and/or pack straps 28 to facilitate carrying or wheeling it around a site to a spot where the dog or other animal can be kept comfortably in the pen. As seen in FIG. 4, the four posts 12, 12, 12, 12 fit together into an two-by-two array with the mesh wall portion 18 and upper rail member 16 contained on or within the respective post and the lower or base rail 14 at one open side of the post 12, where it can be pulled out and down at installation as discussed shortly. The two-by-two array of posts fits easily into the bag or case 24, and can be removed from the bag or case quickly and erected or popped up as the illustrated pet pen 10.

Figure 6:
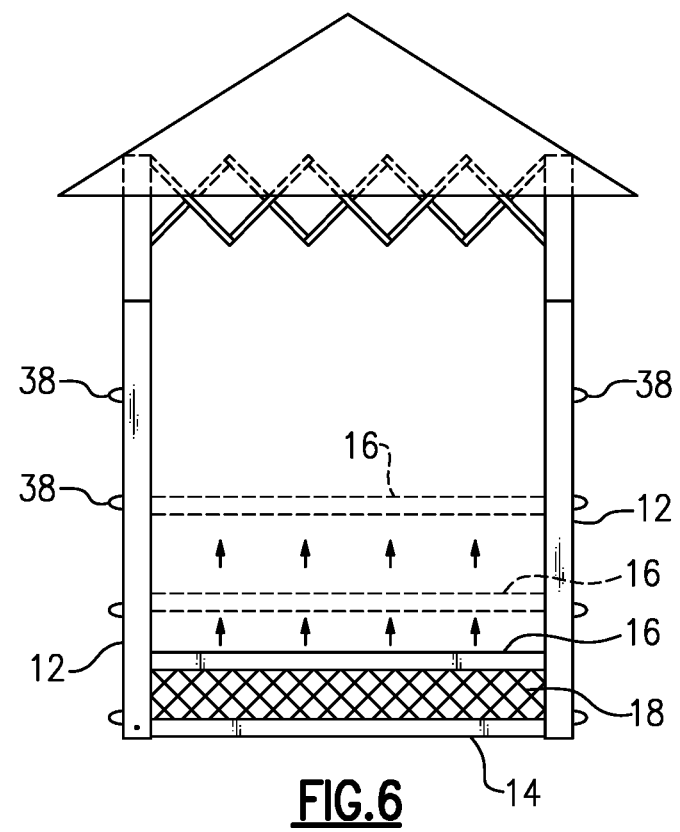
FIG. 6 illustrates the upper side rail being raised together with the associated fencing component.
Figure 7:
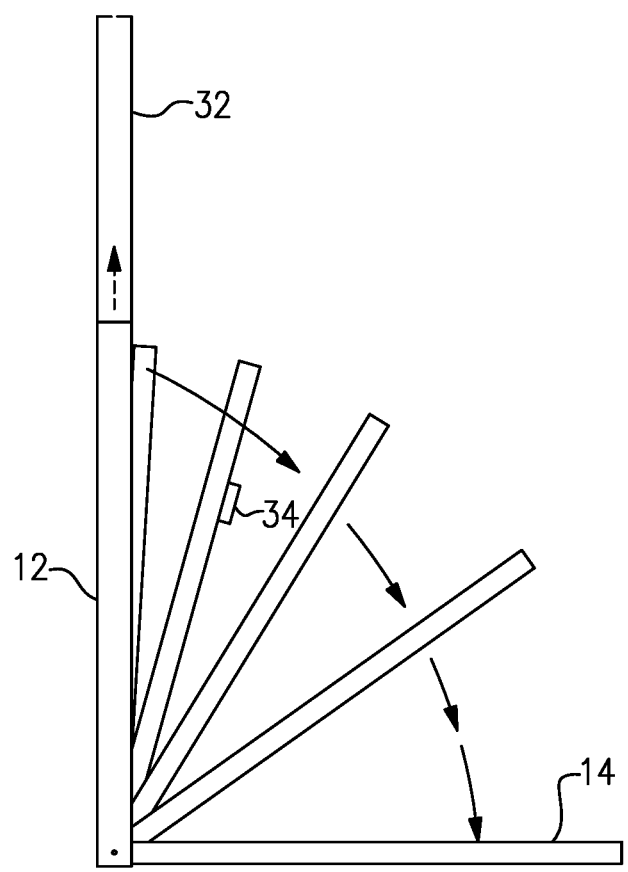
FIG. 7 illustrates the manner in which a vertical extender slides upward to increase the vertical space within the pet pen.
Figure 8:
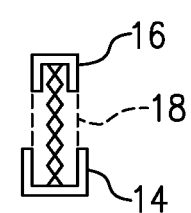
FIG. 8 is a sectional view of one of the base rails and associated top rail and fencing component contained between them.

As shown in FIGS. 5 and 6, with additional reference to FIGS. 7 and 8, in the preferred embodiment as illustrated, the base rail 14 nests on or within the respective leg or post member 12, and is rotatable about a pivot point 30 where one end of the base rail 14 attaches by this pivot to the lower end of the post member 12. The rail swings out from the post 12 and then down to a horizontal position. There the outer or free end of the rail 14 connects to the lower end of an adjacent post 12. Then, as illustrated in FIG. 6, the upper rail member 16 is lifted out and away from the lower or base rail 16, up to the position shown in broken line, at which place the rail member 16 is clamped to the two posts 12 and 12. The rail members 14 and 16 can attach to the next post 12 using snap fasteners, latches or other convenient fastening means. This action also lifts the mesh wall 18 up from within the base rail 14, until the upper rail 16 meets the position shown in broken line in FIG. 6A. Once the rail 14 has been lowered, as shown in FIG. 7, an extensible upper portion 32 of the post can be slid up and out to a higher position shown in FIGS. 1 and 2. This portion 32 slides telescopically in the arrow direction and raises the top of the respective post. As shown in FIG. 8, the upper rail 16 fits into an open side of the base rail 14 and lifts out. This action also lifts out the mesh wall 18 which is compacted in place for storage within the lower or base rail 14. Preferably, there can be release buttons or tabs 34, 36 for the main, base rail member 14 and for the upper rail member 16, respectively, for each vertical post 12. Favorably, a single button can be used for releasing both the bottom rail and the top rail. This can facilitate opening up the rail members 14 and 16 to open part way so they can be more easily pulled to the open position, to facilitate erection of the pet pen.

When the pet pen is to be packed up for travel or storage, this action is reversed, and the mesh wall and upper rail member 16 fit onto or into the base rail member 14. Once the four posts 12 are installed and joined to one another in this fashion, the optional upper support 22 can be pulled out to connect with the adjacent post, as shown in FIGS. 1 and 2, and the roof frame 20 can be assembled to the top of the pen. At this point an optional top cover or rain fly can be put in place on the roof frame 20. As shown in FIG. 1, ground stakes 42 may be used to hold the bottom rail or base rail 14 securely at the ground or other area where the pet pen is to be set up.

Figure 9:
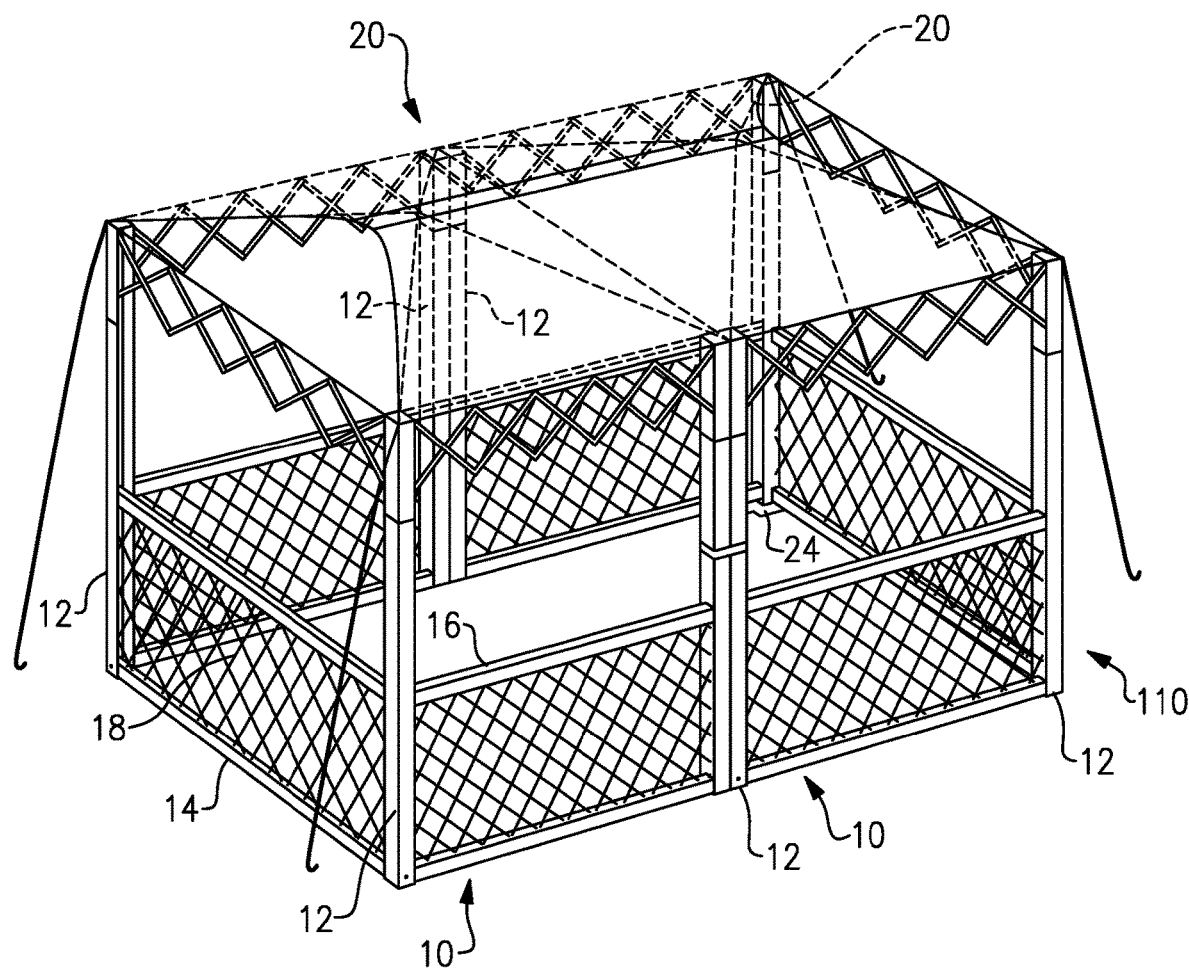
FIG. 9 is a perspective of a double-size pet pen according to an embodiment of the invention.

A double-size pet pen 110, suitable for use with larger dogs, is shown in FIG. 9. Here, there are two of the standard four-foot by four-foot pet pens as discussed in respect to FIG. 1. These are set up but leave one side open. The two open sides of the two pens are then clamped together for form double posts. This unit has an interior area of four-by-eight feet, and can be used for larger animals, e.g. larger breed dogs. The middle is kept open. Also, the roof frame 20 may be present as shown to support a larger size rain fly or other roof or cover. Either a second canvas top or a double-size top can be available for purchase for use on the double-size pet pen configuration.

As shown in FIG. 2, fencing clips 38 may be attached to the posts 12 at different heights to attach additional fencing, especially to use with dogs that are prone to jumping out of the pen.

Many variations of this pop-up pet pen are possible within the scope of the present invention, such as different types of collapsible walls rather than the wire mesh wall portion 18. The pet pen is light-weight and portable, and can be used with a large variety of animals. Because it can be set up in minutes, it is handy for travel where the dog may have to be comfortably confined if off-leash.

As for the support post or corner post 12, an equivalent construction could have the rail 14 hingedly attached against the respective post 12, rather than entirely within it; the claimed invention should be read broadly enough to cover such equivalent variations.

Many modifications and variations of this pet pen may become apparent to persons of skill in this art, without departing from the scope and spirit of this invention, as defined in the appended Claims.

I claim:

1. Portable fold-down, pop-up pet pen for travel with a pet, comprising
    a plurality of corner post members each arranged to be installed vertically on a support surface, each said corner post member including a base rail stored on or within that corner post member and which pulls out away from on or within a lower portion of that corner post member and is adapted to connect a lower end of said corner post member to a lower end of a next one of said corner post members such that the plurality of said corner post members form a polygonal frame; each of said corner post members also including a fencing component that is configured to be pulled from said base rail and to expand therefrom and form a wall extending between that corner post member and the next one of the corner post members; such that the plurality of corner post members together form a pet pen assembly suitable for confining a pet to a small but comfortable space.

2. The portable fold-down pop-up pet pen according to claim 1, wherein each said corner post member includes an upper rail that pulls up and out from said base rail and attaches to that corner post member and to said next one of the corner post members at a predetermined distance elevated above said base rail.

3. The portable fold-down pop-up pet pen according to claim 2, wherein said predetermined distance is about two to three feet above said base rail.

4. The portable fold-down pop-up pet pen according to claim 2, wherein said base rail has one end pivoted to the lower end of the respective one of said corner post members, and is adapted to swing down on the pivoted end to attach to the next one of said post members, and wherein said upper rail and said fencing component are stored on or within the base rail and are adapted to be pulled out and up from said base rail.

5. The portable fold-down pop-up pet pen according to claim 1, wherein each of said corner posts includes a vertical extender member for extending the height of that corner post member.

6. The portable fold-down pop-up pet pen according to claim 5, wherein each said vertical extender member is telescopically contained on the respective corner post member.

7. The portable fold-down pop-up pet pen according to claim 1, wherein said plurality of corner post members comprises four corner post members, and the four corner post members are adapted to be fit together in a two-by-two array for travel and storage.

8. The portable fold-down pop-up pet pen according to claim 7, further comprising a wheeled storage cart within which said two-by-two array is fitted for storage and travel.

9. The portable fold-down pop-up pet pen according to claim 1, wherein each said corner post member has a top portion, and the portable fold-down pop-up pet pen further comprises a top cover for said pet pen, and a top frame that attaches to said tops of said plurality of corner post members and supporting said top cover.

* * * * *